United States Patent Office 3,196,437
Patented July 20, 1965

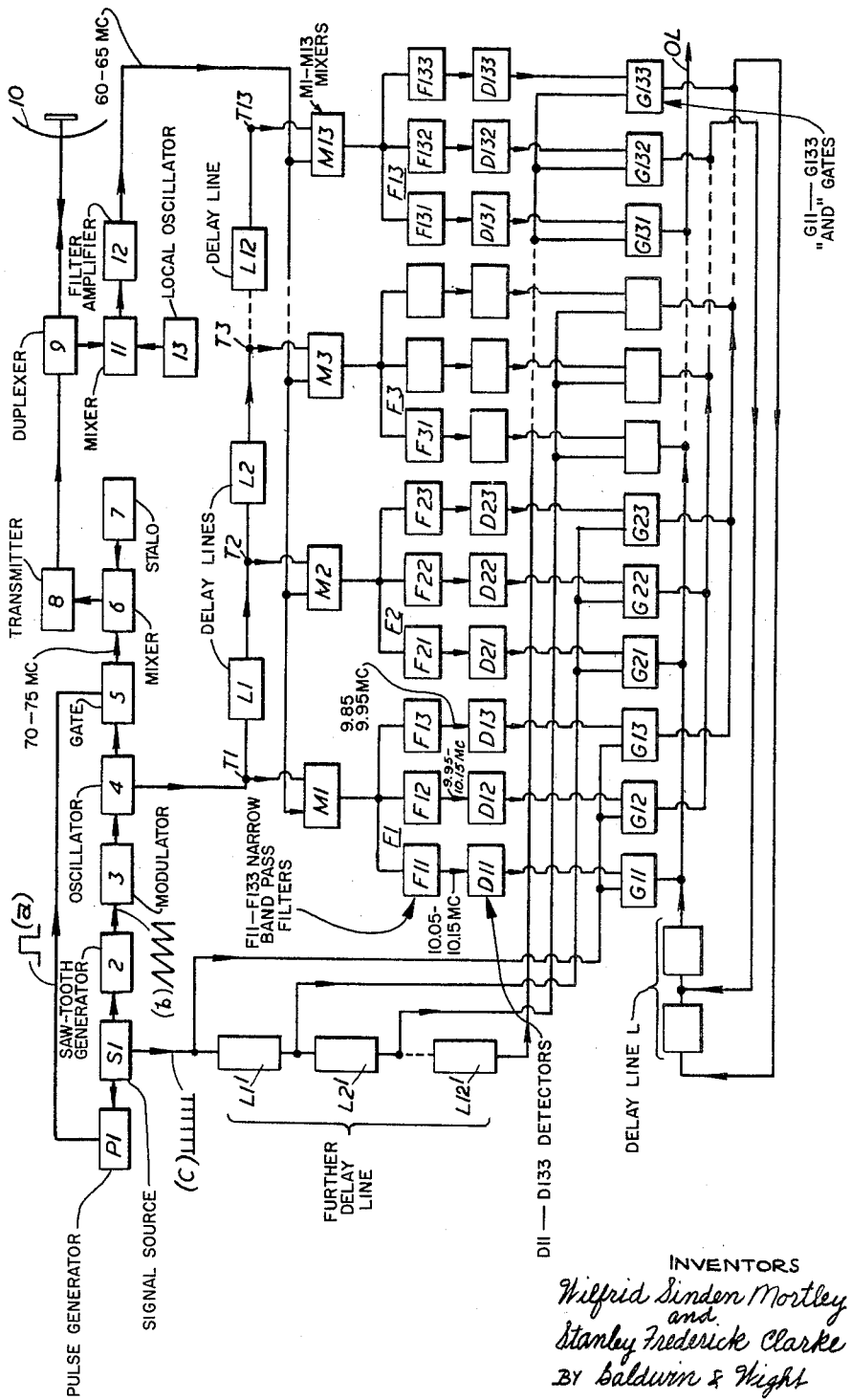

3,196,437
FM PULSE RADAR SYSTEM
Wilfrid Sinden Mortley, Great Baddow, and Stanley Frederick Clarke, Chelmsford, England, assignors to The Marconi Company Limited, a British company
Filed Feb. 25, 1963, Ser. No. 260,660
Claims priority, application Great Britain, June 5, 1962, 21,791/62
4 Claims. (Cl. 343—17.2)

This invention, which is for improvements in or modifications of an earlier invention forming the subject of co-pending patent application No. 40,956, filed July 5, 1960, relates to pulsed radar systems.

As is explained in the specification accompanying the above mentioned co-pending application, in high power pulsed radar systems the transmitted pulses have necessarily to be made of relatively long length since obviously, other things being equal, the energy transmitted is a function of the pulse length. As is well known one of the defects of using a long pulse length in an ordinary pulsed radar system of the kind in which target range is determined merely by measuring the propagation time interval between transmission of a pulse and reception of the corresponding echo pulse is that, since the length of the pulse itself corresponds to a definite amount of range, the longer the pulse length the larger is this corresponding amount of range and the less therefore is the range discrimination of the radar system. In order to overcome this difficulty it is necessary to distinguish between target echoes whose differences of range are within the range amount corresponding to one pulse length. Various attempts so to distinguish have been made—e.g. by reversing the phase transmitted during the pulse according to a predetermined code of phase reversals—but, so far as the present applicants are aware, previous proposals to distinguish between echoes of different parts of the same pulse have offered the disadvantages of excessive complexity and/or great technical and practical difficulties.

The earlier invention seeks to provide improved pulsed radar systems which, though employing relatively long transmitted pulses and being, therefore, capable of transmitting high powers, will, nevertheless, provide range discrimination of the order of that obtainable from an ordinary pulsed radar system using a much shorter pulse.

According to the earlier invention in its broadest aspect, a pulsed radar system comprises means for transmitting pulses of frequency modulated waves, means for receiving reflected echo pulses of said waves, means for deriving from the modulation band occupied by the received echo signals a sub-band of band width which is narrow in relation to said modulation band, and means for utilizing signals derived from said sub-band, in dependence on their time relation with the frequency modulation of the transmitted pulses, for range indication.

According to a feature of the earlier invention a pulsed radar system comprises means for transmitting pulses of frequency modulated waves each pulse being of predetermined relatively long length, means for providing a first set of signals frequency modulated in correspondence with said transmitted waves, means for deriving from received echo signals a second set of signals occupying a band of frequencies of width corresponding to the width of the modulation band of frequencies transmitted, means for frequency comparing the signals of one set with a plurality of relatively delayed replicas of the signals of the other set and means responsive to the occurrence of a predetermined frequency relation in said frequency comparison for providing target range information.

In one way of carrying out the earlier invention there are provided a delay line of length equal to the period of cyclic variation of the frequency of the waves for transmission and having a plurality of terminals each separated from the next by a portion of line having a delay equal to a fraction of said period; a plurality of mixers each connected to mix two inputs, one input comprising said first set of signals frequency modulated in correspondence with the transmitted waves and one comprising said second set of signals derived from received echo signals, one of the two inputs to each mixer being fed directly thereto and the other being fed thereto via a different terminal on said delay line whereby the said other inputs to the different mixers are delayed by amounts differing from one another by the delay of one portion of said delay line; a plurality of narrow band filters each having substantially the same band pass and each fed with output from a different mixer, the band pass width of each filter being approximately equal to the quotient of the width of the transmitted frequency band divided by the number of filters and each centered on the common beat frequency output from the mixers; means for separately detecting the output of the filters; and means for combining the detected outputs for utilization.

In such an arrangement the delay line might, in a practical case, be divided into 60 portions with the consequent provision of 61 mixers and 61 narrow band filters. It is the main object of the present invention to provide pulsed radar systems, otherwise in accordance with the earlier invention, wherein there is effected, without loss of performance, a considerable economy in the amount of equipment required.

According to this invention a pulsed radar system comprises means for transmitting pulses of frequency modulated waves, each pulse being of predetermined relatively long length, means for providing a first set of signals frequency modulated in correspondence with said transmitted waves, means for receiving reflected echo pulses, means for deriving from received echo pulses a second set of signals frequency modulated in correspondence therewith, means for frequency comparing the signals of one set with a plurality of relatively delayed replicas of the signals of the other set and means responsive to the occurrence, in any of the frequency comparisons, of any of a group of predetermined frequency relations for providing target range information.

According to a feature of this invention a pulsed radar system comprises a source of waves cyclically frequency modulated at a predetermined recurrence frequency; means for transmitting pulses of waves frequency modulated in correspondence with the waves from said source; means for receiving reflected echo pulses; means for deriving from received echo pulses signals frequency modulated in correspondence therewith; a delay line of length equal to the period of cyclic recurrence of frequency modulation of the waves from said source and having a plurality of terminals each separated from the next by a portion of line having a delay equal to a fraction of said period; a plurality of mixers each connected to mix two inputs, one input comprising the waves from said source and one comprising said derived signals, one of the two inputs to each mixer being fed directly thereto and the other being fed thereto via a different terminal on said delay line whereby the said other inputs to the different mixers are delayed by amounts differing from one another by the delays of said portions of the delay line; a plurality of similar groups of narrow band filters, each group of filters being fed with the output of a different mixer and the filters of each group having different but adjacent pass bands; and means for utilizing the outputs of said filters for providing target range information.

Preferably the width of the pass band of each filter is not substantially more than the inverse of the transmitted pulse length and may be considerably less.

The number of filters in each group may be chosen in dependence on practical considerations relating to the number of portions into which the delay line may be divided and on economic considerations relating to the number of narrow band filters of different frequency which may be conveniently manufactured. Thus in the practical case cited above, in relation to the earlier invention in which the delay line is divided into 60 portions, the delay line provided in accordance with the present invention might conveniently be divided into 12 portions, there being provided 13 groups of three filters each and 13 mixers.

In a preferred way of utilising the filter output signals there are provided groups of gate circuits, one group for each group of filters each gate circuit being connected to receive the output of a different filter, means for gating said gate circuits to the open condition by gating signals of the frequency of cyclic recurrence of the frequency modulation of waves from said source, said gating signals being applied simultaneously to the gate circuits in each group and with delays which inter se are equal to the delays provided by successive portions of said delay line to the different groups of gate circuits, means for relatively delaying the gated output signals of the successive gate circuits in each group by amounts equal to the delay of each portion of the delay line divided by the number of filters in each group and means for feeding the relatively delayed gated output signals to a common channel utilisation.

Preferably the gated output signals from the different successive gate circuits in each group are applied to different successive tapping points on a second delay line having an overall delay equal to that of each portion of said first-mentioned delay line, with the delay between said tapping points substantially equal to said overall delay divided by the number of gate circuits in each group, one end of said second delay line being connected to said common channel.

The invention is illustrated in the accompanying drawing which is a block diagram of one embodiment of the invention. In describing the drawing certain frequencies will be given, but it is to be understood that these are purely by way of example and in no sense limiting.

Referring to the drawing, P1 is a pulse generator producing rectangular pulses as represented at (a) at a desired pulse repetition frequency which, in the present example, is 250 pulses per second. The pulses from the generator P1 are locked by the signals from a signal source S1 having a frequency of, for example, $8 \times 10^4$ pulses per second. The signals from the source S1 trigger or otherwise control a saw-tooth generator 2 of the same frequency, i.e. producing $8 \times 10^4$ saw-tooth per second. The saw-tooth excursions are represented at (b) and the signals from S1 at (c). The length of each pulse (a) is 10 μsec. and it will be seen that with the tooth frequency just given the length of each tooth will be 12½ μsec. and is such that each tooth overlaps the pulse at both ends. The saw-tooth output from the generator 2 is used to control a reactance valve or modulator 3 in known manner to vary the frequency of a high frequency oscillator 4. This oscillator has, in the present example, a frequency range of 69.5 to 75.5 mc./s. and is varied in frequency over this range from the lower limit to the upper limit by each saw-tooth sloping flank. Varying frequency output from the oscillator 4 is fed through a gate 5 to a mixer 6. The gate 5 is opened by the pulses (a) from the generator P1. The whole arrangement is such that the middle of each period of opening of the gate 5 corresponds to the middle of the sloping flank of a saw-tooth. Since the length of each sloping flank is, as already stated, a little more than the length of each pulse (a) the waves passed by the gate 5 will vary in frequency over a range corresponding to the greater part of, but not the whole of, a saw-tooth sloping flank so that there is no risk of the signals passed by the gate 5 varying sharply in frequency due to either end of a tooth flank being reached while the gate is open.

The second input to the mixer 6 is taken from a so-called "Stalo" 7, i.e. a stabilised local oscillator, and the resultant of mixing is fed to a transmitter 8 which transmits the pulses via a known duplexer 9 to a transmitting aerial 10 which, in the example illustrated, is used also for reception. To quote a practical figure, during each of the 10 μsec. pulses transmitted from the aerial 10 the transmitted frequency may rise during the pulse by 5 mc./s. It will be noted that the width of the frequency range of the oscillator 4 was above given as 6 mc./s.

Received echo signals from the aerial 10 are fed through the duplexer 9 to a mixer 11 whose second input is also taken from the second local oscillator 13. This mixer feeds into a filter amplifier 12 having a band pass of 60 to 65 mc./s.

Output from the oscillator 4 is also fed to one end of a delay line capable of handling a frequency range of about 69 to 76 mc./s. with small dispersion and consisting of a number of identical portions L1, L2, L3 . . . L12 in series. The overall delay provided by the line is equal to the saw tooth repetition period of 12½ μ per sec. The delay line has terminals T1, T2 . . . T13, each successive pair of which are separated in time by the delay of one portion of the line whereby there appear at terminals T1, T2 . . . T13 relatively delayed replicas of the signals from oscillator 4.

The output from the amplifier 12 consisting of a band of frequencies of 60 to 65 mc./s., is fed directly to mixers M1, M2 . . . M13, each of which receives its second input from the oscillator 4 via a different terminal T1, T2 . . . T13 on the delay line. The frequency of oscillator 13 is arranged to be such that the output frequency from the mixers M1, M2 . . . M13 shall not reach or approach zero but shall always be of a convenient relatively high value—in the present example around 10 mc./s.

Each mixer M1, M2 . . . M13 feeds into its own group of narrow band pass filters F1, F2 . . . F13, all the groups of filters being identical and the different filters of each group, for example the filters F11, F12 and F13 forming group F1 being of different centre frequencies but having adjacent pass bands. Thus in the present example F11 has a pass band of 10.05–10.15 mc./s., F12 a pass band of 9.95–10.05 mc./s. and F13 a pass band of 9.85–9.95 mc./s. In the different groups correspondingly numbered filters (e.g. F11, F21, F31 . . . F131) have corresponding pass-bands.

Where, as may commonly be the case, the radar system employs a multiplicity of receivers (for example, each "watching" a different volume of space) there will be provided a similar multiplicity of sets of mixers M1, M2 . . . M13 each set of mixers being connected to a different receiving channel and each mixer receiving one of its inputs from one of the terminals T1, T2 . . . T13 of the delay line.

It will now be apparent that at the time of occurrence of an echo pulse there will exist at the output of one of the mixers M1, M2, . . . M13 a narrow band of signals of frequency within the range of frequency 9.85–10.15 mc./s., the time relation between the reception of the echo pulse and the recurrence of the signals from oscillator 4 determining which of the mixers provides the aforesaid output. This narrow band of signals, which will exist for the duration of the received echo pulse, will appear at the output of one of the filters in the group supplied from the mixer in question, the time of occurrence of the echo pulse determining which of the filters provides an output signal. Consequently it will be seen that by determining which of the filters provides an output signal it is possible to determine the range of the echoing target with a discrimination which is very much greater than the range bracket to which the transmitted pulse length is appropriate.

Theoretically the range discrimination will be that appropriate to a transmitted pulse only 0.2 μsec. (approximately) long, i.e. range discrimination of about 100 ft. In practice, however, it is not expected to achieve the theoretical range discrimination mainly because of unavoidable imperfections in the delay line which is theoretically required to have a very low dispersion over the whole band width which it handles. In practice, the delay line may take any of a variety of different forms, but it is proposed to constitute it by lengths of polythene cable. The attenuation of such a cable-delay line is high and therefore amplifiers (not shown) will ordinarily be required between its portions. However, although for practical reasons, the theoretically possible range discrimination is not expected to be achieved, the improvement in range discrimination over an ordinary known radar system of the same transmitted pulse length is very great.

The outputs from the filters F11, F12, F13 ... F21, F22, F23 etc. are separately detected by detectors D11, D12, D13 ... D21, D22, D23 ... etc. and utilised in any convenient way. For example they may be fed to any convenient form of computer or like means adapted to give target range information. The present invention is not concerned with such computer or like means, however, and they are therefore not described.

The outputs from the detectors may be used to operate an ordinary P.P.I. or other display tube and the drawing shows one arrangement enabling this to be done. The apparatus for this purpose includes a further delay line which provides the same delay as the delay line already mentioned and consists of the same number of equal portions L1′, L2′ ... L12′.

There are also provided a number of groups G11, G12, G13, ... G21, G22, G23 ... etc. of so-called "and" gates, each group being connected to a different portion of the further delay line and each gate connected to receive one input from the further delay line and its other input from the detector fed by the corresponding narrow band filter. To one end of the further delay line are applied gating signals constituted by signal (of frequency $8 \times 10^4$ per sec.) from the signal source S1. These gating signals pass down the further delay line and are applied simultaneously to the gates of any one group and, with the delays of the different portions of the further delay line, to the different groups. Gated output signals from corresponding gates G11, G21 ... G131 are applied directly to a common output line OL connected to the display tube (not shown) the output signals from the remaining different gates in each group being applied to different tapping points on a further, short, delay line L whose overall delay is equal to $$\frac{(n-1)}{n}$$

times that of each portion of the first delay line, where $n$ is the number of gates in each group. The different tapping points on delay line L are separated by portions of equal delay and one end of line L is connected to the output line OL, whereby the time of occurrence of a gated output signal on line OL is indicative of the narrow-band filter from which it is derived and is consequently indicative (with high discrimination) of the range of the target.

The provision of the further delay line L1′, L2′ ... L13′ is of course not essential and the differently delayed gating pulses for application to the different groups of gates could be obtained from a suitable pulse synthesiser incorporated for example in unit S1.

We claim:

1. A pulsed radar system comprising a source of waves cyclically frequency modulated at a predetermined recurrence frequency; means for transmitting pulses of waves frequency modulated in correspondence with the waves from said source; means for receiving reflected echo pulses; means for deriving from received echo pulses signals frequency modulated in correspondence therewith; a delay line of length equal to the period of cyclic recurrence of frequency modulation of the waves from said source and having a plurality of terminals each separated from the next by a portion of line having a delay equal to a fraction of said period; a plurality of mixers each connected to mix two inputs, one input comprising the waves from said source and one comprising said derived signals, one of the two inputs to each mixer being fed directly thereto and the other being fed thereto via a different terminal on said delay line whereby the said other inputs to the different mixers are delayed by amounts differing from one another by the delays of said portions of the delay line; a plurality of similar groups of narrow band filters, each group of filters being fed with the output of a different mixer and the filters of each group having different but adjacent pass bands; and means for utilising the outputs of said filters for providing target range information.

2. A pulsed radar system as claimed in claim 1 wherein the width of the pass band of each filter is not substantially more than the inverse of the transmitted pulse length.

3. A system as claimed in claim 1 wherein there are provided groups of gate circuits, one group for each group of filters, each gate circuit being connected to receive the output of a different filter, means for gating said gate circuits to the open condition by gating signals of the frequency of cyclic recurrence of the frequency modulation of waves from said source, said gating signals being applied simultaneously to the gate circuits in each group and with delays which inter se are equal to the delays provided by successive portions of said delay line to the different groups of gate circuits, means for relatively delaying the gated output signals of the successive gate circuits in each group by amounts equal to the delay of each portion of the delay line divided by the number of filters in each group and means for feeding the relatively delayed gated output signals to a common channel for utilisation.

4. A system as claimed in claim 3 wherein the gated output signals from the different successive gate circuits in each group are applied to different successive tapping points on a second delay line having an overall delay equal to that of each portion of said first-mentioned delay line, with the delay between said tapping points substantially equal to said overall delay divided by the number of gate circuits in each group, one end of said second delay line being connected to said common channel.

References Cited by the Examiner

UNITED STATES PATENTS 2,913,717    11/59    Brandon et al.    343—17.2

CHESTER L. JUSTUS, *Primary Examiner.*